(12) United States Patent
Laux et al.

(10) Patent No.: US 12,185,733 B2
(45) Date of Patent: Jan. 7, 2025

(54) COLD-BREW COFFEE EXTRACTS AND METHODS OF PRODUCING THE SAME

(71) Applicant: MASTERCOLDBREWER AG, St. Gallen (CH)

(72) Inventors: Roland Laux, Roggwil (CH); Tilo Hühn, Schönenberg (CH)

(73) Assignee: MASTERCOLDBREWER AG, St. Gallen (CH)

( * ) Notice: Subject to any disclaimer, the term of this patent is extended or adjusted under 35 U.S.C. 154(b) by 0 days.

(21) Appl. No.: 17/768,397

(22) PCT Filed: Oct. 16, 2020

(86) PCT No.: PCT/EP2020/079213
§ 371 (c)(1),
(2) Date: Apr. 12, 2022

(87) PCT Pub. No.: WO2021/074378
PCT Pub. Date: Apr. 22, 2021

(65) Prior Publication Data
US 2024/0122201 A1 Apr. 18, 2024

(30) Foreign Application Priority Data
Oct. 18, 2019 (EP) ................................. 19204121

(51) Int. Cl.
*A23F 5/26* (2006.01)
*A23F 5/08* (2006.01)
(Continued)

(52) U.S. Cl.
CPC .................. *A23F 5/26* (2013.01); *A23F 5/08* (2013.01); *A23F 5/243* (2013.01); *A23F 5/30* (2013.01); *A23F 5/34* (2013.01)

(58) Field of Classification Search
CPC ...... A23F 5/08; A23F 5/26; A23F 5/30; A23F 5/34; A23F 5/243
See application file for complete search history.

(56) References Cited

U.S. PATENT DOCUMENTS

2016/0270587 A1 9/2016 Yu et al.
2018/0000108 A1* 1/2018 Boggavarapu ...... A47J 31/5251
2019/0390147 A1* 12/2019 Bassoli ................. A23F 5/246

FOREIGN PATENT DOCUMENTS

CA 2960108 A1 3/2016
EP 0343678 A2 11/1989
(Continued)

OTHER PUBLICATIONS

English Translation for EP0343678 published Nov. 29, 1989.*
"European Search Report", EP Application 19204121, issued Apr. 14, 2020.

*Primary Examiner* — Anthony J Weier
(74) *Attorney, Agent, or Firm* — Saul Ewing LLP; Kathryn Doyle; Domingos J. Silva (57) ABSTRACT

The present disclosure relates to methods and/or techniques for the production of cold-brew coffee extracts, which enable continuous and rapid extraction and simultaneously improved yield of aromatic constituents and nutritionally beneficial components (e.g., polyphenols, antioxidants, and/or sugars) when compared to known cold-brew techniques. The method enables continuous processing within a shortened time frame, while producing extracts with improved flavour yield, intensity and body. In addition, cold-brew coffee extracts and instant powders prepared by said methods are described.

19 Claims, 3 Drawing Sheets

(51) Int. Cl.
*A23F 5/24* (2006.01)
*A23F 5/30* (2006.01)
*A23F 5/34* (2006.01)

(56) References Cited

FOREIGN PATENT DOCUMENTS

| | | |
|---|---|---|
| WO | 2018234528 A1 | 12/2018 |
| WO | 2020/181212 A1 | 9/2020 |

\* cited by examiner

COLD-BREW COFFEE EXTRACTS AND METHODS OF PRODUCING THE SAME

CROSS-REFERENCE TO RELATED APPLICATIONS

The present application is a 35 U.S.C. § 371 national phase application from, and claims priority to, International Application No. PCT/EP2020/079213, filed Oct. 16, 2020, and published under PCT Article 21(2) in English, which claims priority under 35 U.S.C. § 119(e) to European Patent Application No. 19204121.8, filed on Oct. 18, 2019, all of which applications are incorporated herein by reference in their entireties.

BACKGROUND OF THE INVENTION

Coffee is among the world's largest legal agricultural exports and numerous methods for the preparation of coffee extracts and coffee beverages are known in the art. Most coffee beverages are typically prepared by subjecting grounded beans to aqueous extraction at elevated temperatures under high or atmospheric pressure, including filter coffee, espresso, Greek or Turkish coffee, percolated coffee, and cona coffee, for example.

Coffee is also known to be brewed using cold extraction techniques yielding extracts that are often perceived to have a smoother mouthfeel and as being sweeter in comparison to hot-brewed coffee, which is presumably due to a lower concentration of extracted acids and lower concentration of diterpenes (including cafestol and kahweol, for example), which are known to promote an increase of cholesterol levels and to which oily and bitter flavors are ascribed.

One conventional example of a cold extraction technique is described in WO 2013/019676 A2. Herein, freshly ground roasted coffee beans are cold-brewed at atmospheric pressure using water at a temperature of less than 47.2° C. (117° F.), which advantageously reduces heat-induced degradation of enzymes and antioxidants usually observed during hot extraction methods. To provide sufficient release of coffee flavors, the brewing duration is typically between 18 and 24 hours prior to separation of the liquid extract from the solids (e.g. by filtration, decanting, centrifugation, or the like).

In another example, US 2008/0148955 A1, discloses an apparatus for extracting a coffee in the form of a liquid extract through cold water infusion, which involves brewing at room temperature for approximately 12 to 24 hours and results in a concentrated coffee extract, which may be diluted to provide a ready to drink-beverage and which is described as being more flavorful than a conventionally hot-brewed coffee product. 1

However, the conventional cold-brewing techniques exemplified by WO 2013/019676 A2 and US 2008/0148955 A1 essentially require long brewing durations to extract a sufficient amount of flavors and satisfactory aroma. Also, extending the brewing periods (e.g. fora period of days or weeks) to enhance aroma yield tends to be accompanied with an over-extraction of aromas with undesirable sensory notes (e.g. bitter flavors), off-flavors (caused by degradation of compounds, for example) and a poor aroma complexity.

Recently, vacuum brewing methods have been developed, which enable preparation of cold brew coffee at short extraction times (see EP 2 948 030 B1, for example). However, said methods necessitate batch operation.

In addition, all of the aforementioned methods tend to require elaborate equipment or involve high material stress during dry milling and grinding, which further leads to aroma loss due to evaporation.

In the recent years, efforts have been made to improve the capture rate of coffee by products by employing wet milling techniques.

For example, WO 2010/073114 A1 discloses coffee extraction methods, wherein water is added to roasted coffee beans, the resulting suspension is wet ground, and one or more extraction steps are performed on the ground or milled coffee beans with heat and under pressure (e.g., at a temperature of between 80 to 100° C.) to obtain coffee powder, coffee liquid, aroma extracts, polyphenols and/or bio-actives. However, this method essentially requires an extraction step under heat and thus does not lead to the benefits attributed to a cold-brew coffee product. A similar method adapted for the preparation of novel extracts based on non-roasted and preferably non-fermented coffee cherries is disclosed in WO 2018/234528 A1. However, the preparation of a cold-brew coffee product is not disclosed therein. EP 0 343678 A2 discloses a method of producing coffee extracts for aromatisation of edible products, the method comprising at least two grinding steps in water, each step requiring a separation of the aqueous phase from the solids. CA 2 960 108 A1 discloses a coffee extraction method comprising brewing at elevated temperatures under reduced pressure. WO 2018/234528 A1 discloses coffee cherry processing methods.

Overall, it therefore remains desirable to provide a method for the preparation of cold-brew coffee which exhibit a flavour intensity and body comparable to or even higher than that of their hot brew counterparts, and which simultaneously enables continuous processing within a shortened time frame (e.g., within less than one hour, or in minutes).

BRIEF SUMMARY OF THE INVENTION

The present invention solves this object with the subject matter of the claims as defined herein. The advantages of the present invention will be further explained in detail in the section below and further advantages will become apparent to the skilled artisan upon consideration of the invention disclosure.

Generally speaking, in one aspect the present invention provides a method for producing a cold-brew coffee extract, comprising the steps of: (1) adding water to coffee beans to form a suspension; (2) wet grinding said suspension in multiple steps to an average particle size of 100 μm or less; (3) subjecting said suspension to one or more separation steps, wherein the suspension is separated into at least one liquid phase and a solid phase, said liquid phase comprising coffee aroma, and said solid phase comprising coffee powder and water as major components; and (4) further processing at least the liquid phase comprising coffee aroma to provide the cold-brew coffee extract; wherein the temperature of the suspension during steps (1) to (3) does not exceed 47° C.

In a further embodiment, cold-brew coffee extracts obtained by the aforementioned method are described.

In another embodiment, an instant cold-brew coffee powder is described, which is obtained by subjecting the aforementioned cold-brew coffee extract to a concentration step, followed by spray-drying or freeze drying of the concentrated extract to obtain the instant cold-brew coffee powder.

DETAILED DESCRIPTION OF THE INVENTION

For a more complete understanding of the present invention, reference is now made to the following description of the illustrative embodiments thereof:

Method of Producing Cold-Brew Coffee Extracts and Instant Powders

In a first embodiment, the present invention generally relates to a method for producing a cold-brew coffee extract, comprising the steps of: (1) adding water to coffee beans to form a suspension; (2) wet grinding said suspension in multiple steps to an average particle size of 100 μm or less; (3) subjecting said suspension to one or more separation steps, wherein the suspension is separated into at least one liquid phase and a solid phase, said liquid phase comprising coffee aroma, said oil phase comprising coffee oil as major component, and said solid phase comprising coffee powder and water as major components; and (4) further processing at least the liquid phase comprising coffee aroma to provide the cold-brew coffee extract; wherein the temperature of the suspension during steps (1) to (3) does not exceed 47° C. Advantageously, it has been found that the method results in a cold-brew extract with surprisingly high flavor yields even after extremely short extraction periods of less than one hour. Accordingly, compared to conventional methods, a cold-brew coffee extract with a higher yield of originary aromas and nutritionally valuable components may be obtained in a significantly shorter period of time. In addition, the cold-brewing process may be performed continuously and requires minimum space for the production equipment, which is especially advantageous for up-scaling and ultimately reduces the production costs when compared to known batch processes. Last but not least, continuous operation facilitates process control and thus helps to reduce variations in product quality.

The term "cold-brew coffee", as used herein, denotes the product of aqueous extraction of ground coffee obtained without actively heating the extractant with dedicated heating means, wherein actively heating does not include temperature increases during mechanical separation (e.g. during fine milling).

According to the present invention, coffee beans (whole and/or pre-cracked) are used as starting material. The coffee beans may be non-roasted (also known as green coffee beans) or roasted. Roasting may be brought about by various techniques and methods known in the art, which may include variable roasting temperatures, times, and methodologies. The roasting degree can be varied to alter the desired strength and flavor. In the context of the present application, any type of roasted coffee beans can be generally used. Preferably the coffee beans are roasted immediately prior to step (1). To introduce additional flavors and to enable their interaction with coffee aroma, other solid edible material (e.g. fruits) may be co-extracted with the coffee beans, preferably by addition prior to or during any of steps (1) or (2).

In step (1), water is added to form a suspension. While not being particularly limited, the weight ratio of water to coffee beans in the formed suspension is preferably between 1:1 to 10:1, more preferably 2:1 to 8:1, especially preferably about 2.5:1 to 6:1, which may advantageously affect the processability in the further steps (e.g. facilitated pumping, grinding and/or easier phase separation).

While it may be preferred to use water (e.g. tap water) in step (1), alternative water-containing liquids may also be used as a source of water in order to enhance the extraction of coffee bean components, reduce oxidation of sensitive coffee bean components (e.g. sulfur compounds) and/or to introduce additional flavors, which may favorably interact with the extracted flavors at subsequent stages of the processing method. Such liquids may include liquids having water contents of from 60 to about 95% by weight, such as ethanol/water mixtures, liqueurs, fruit juices, vegetable juices, fruit juice concentrates, or milk, for example. In case such water-containing liquids are used, it is generally preferable that the water content in the formed suspension falls into the above-defined ratios.

In order to reduce or prevent microorganism spoilage/propagation at an early stage while minimizing potential thermal burden, the water or water-containing liquid may be subjected to a pasteurization or sterilization step according to methods known in the art before step (1), e.g. by application of heat, irradiation, chemical sterilization, and micro-, ultra- or nanofiltration, for example. Sterile filtration with filtration membrane filters having an absolute pore size rating of 0.45 μm or less, preferably 0.22 μm or less, is preferred and will usually effectively remove microorganisms with low energy expenditure and without introducing undesired chemicals.

In addition, the water or water-containing liquid may be subjected to demineralization according to techniques known in the art (including ion exchange, for example) before step (1).

Forming the aqueous suspension in step (1), i.e. before step (2) has the advantage that solid material is softened prior to grinding and the cooling effect of water further minimizes the mechanical burden on milling equipment. However, for accelerated processing, the coffee beans are preferably brought into contact with the water immediately before entering the grinding equipment. Further preferably, steps (1) and (2) are performed simultaneously, e.g. by contacting water and beans directly in the mill.

The methods and devices used for wet grinding in step (2) are not particularly limited as long as significant frictional heat production or high mechanical forces are avoided in order to preserve the aromas and nutritionally valuable components of the coffee beans. For this purpose, step (2) preferably comprises: (a) one or more coarse grinding step(s) to an average particle size of 500 μm or less (e.g., in a perforated disc mill), and (b) a subsequent fine grinding step to an average particle size of 100 μm or less, preferably less than 90 μm, even more preferably 80 μm or less (e.g. in a toothed colloid mill). Reducing the particles to the above size ranges range substantially increases the exposed surface area of the particle material for optimized wetting, which enables improved extraction results (such as improved extraction of fats or lipids, aromatic substances, and/or polyphenols). In general, the particle size reduction may be accomplished by using disc mills (e.g. perforated disc mill), colloid mills (e.g. toothed colloid mills), or corundum stone mills, for example. Notably, the fine grinding step is carried out with the coarsely ground suspension, so that a solid/liquid separation between coarse and fine grinding is not required.

In step (3), the finely ground coffee suspension is subjected to one or more separation steps effecting separation into at least one liquid phase and a solid phase, said liquid phase comprising coffee aroma, and said solid phase comprising coffee powder and water as major components. Preferably, devices employing centrifugal forces may be utilized to achieve mechanical particle separations, such as decanters or nozzle separators, preferably decanters.

The term "at least one liquid phase" may include a water phase and an oil phase, wherein the water phase comprises (hydrophilic) coffee aromas and the oil phase comprises coffee oil as major component. In other words, step (3) may be carried out as a solid/liquid separation or as a separation into three phases, i.e. a water phase, an oil phase and a solid phase. In case of the three-phase separation, at least the water phase is further processed in step (4).

In a preferred embodiment, step (3) comprises a step of separating the suspension into the water phase, the oil phase and the solid phase by the use of a decanter (such as a three-phase decanter centrifuge, for example) in a single separation stage.

Step (3) may further comprise multiple phase separation and recombination steps to achieve an improved separation between the liquid phase(s) and the solid phase. For example, the water and oil phases obtained in the three-phase separation may be further purified, e.g. by performing a second three-phase separation step or by re-feeding into the wet-grinding stage or the initial separation stage, in order to further improve the recovery and yield of extracts. The solid phase may filtered or centrifuged to separate remaining water, which may be recombined with the water phase from the initial decanting step or at a later processing stage of said phases.

If separated, the oil phase obtained in step (3) may be used to extract coffee oil and/or lipophilic aromas. The resulting coffee oil may be further used in the preparation of cosmetic products (e.g., lotions, soaps) or in chemical processes, for example, while lipophilic aromas may be reintroduced in step (4).

In step (4), the liquid phase (or water phase, respectively) is further processed to provide a cold-brew coffee extract. A single stage (three-)phase separation in step (3) will typically yield a liquid aqueous cold-brew coffee extract with a cloudy appearance, which is, however, ready to drink and is characterized by favourably intense and complex organoleptic properties with milk-like attributes not attainable with conventional cold-brewing techniques, having favourably low acidity and bitterness. The thus obtained extract exhibits relatively high residual fat content (e.g. from 1 wt.-% to 10 wt.-%, such as from 1.5 wt.-% to 5 wt.-%, based on the total weight of the extract), which is presumably responsible for the pleasant and creamy mouthfeel and serves as a carrier for favourable lipophilic aromas, and may further have a dry matter content from 2 wt.-% to 12 wt.-%, such as from 2.5 wt.-% to 10 wt.-%, for example, based on the total weight of the extract. Upon clarification, for instance, by filtration or ultrafiltration methods, a large fraction of the residual lipids are removed, which, however, results in a loss of the above-described organoleptic characteristics. Therefore, it may be preferable that step (4) or even the entire production method does not include a filtration and/or clarification step. For the removal of microorganisms, the aforementioned cloudy extract may thus be directly subjected to a pasteurization or sterilisation step to provide the cold-brew coffee extract, which is optionally followed by a filling, bottling or canning step according to methods known in the art (e.g. by cold aseptic filling).

Alternatively, step (4) may comprise subjecting the liquid or water phase obtained in step (3) to one or more solid/liquid separation steps to clarify the extraction product. Further preferably, the one or more solid/liquid separation steps include a centrifugation step and/or a filtration step. In order to remove as much lipids and colloidal solids as possible, it is further preferable for the one or more solid/liquid separation steps to comprise both a centrifugation step and a filtration step. The filtration step is preferably performed as sterile filtration by using a filter membrane with an absolute pore size rating of 0.45 µm or less, preferably 0.22 µm or less, which may also include ultrafiltration methods using membranes with an absolute pore size rating of 2 to 100 nm. In another preferred embodiment, the filtration step is carried out as a cross-flow filtration to facilitate continuous operation. A separate process step of removing colloidal solids (preferably before filtration) may be carried out according to methods known in the art (including coagulation/flocculation techniques, for example) which may be optionally assisted by cooling.

The result of step (4) is a ready-to-drink cold-brew coffee extract, which may be diluted with cold or hot water or other liquids according to the desired taste.

In addition, the aqueous extract may be further mixed with additives during or after step (4). While not being limited thereto, exemplary additives may include coffee cherry pulp, cocoa pulp, bio-active ingredients, cocoa, fresh milk, condensed milk, milk powder, salt, sugars or other sweeteners (including maple syrup, honey, sucrose, fructose, glucose syrup, invert sugar, fruit sugar, corn syrup, sucralose, acesulfame potassium, aspartame, saccharin, cyclamates, acesulfame-K, thaumatin, chalcone, cyclamate, stevioside, stevia, sorbitol, xylitol and lactitol etc.), flavours, essential oils, vitamins, minerals, fruit juice(s) and/or fruit pieces, herbs and/or spices (including without limitation cinnamon, ginger, coriander, cumin, turmeric, chili, pepper, cardamom, cloves, nutmeg, etc.), preservatives, colourants, thickeners, stabilizers, emulsifiers and combinations thereof, for example.

While not being necessary, one or more pH modulation steps may be performed before, during or after any of steps (1) to (4). Typically, said pH modulation may involve addition of buffer solution or base in order to compensate for overly high acid concentrations in the starting material and/or fine-tune the subsequent extraction profile. In addition, added base or buffer may be neutralized in the water phase after step (3). Alternatively, a pH modulation step may also comprise removal of acids, for example by extraction (e.g. liquid-liquid) extraction, emulsion-type liquid membrane processes, salting out or combinations thereof.

The process according to the present invention may also comprise a step of charging the liquid extract with nitrogen gas, preferably in step (4), according to methods known in the art, in order to produce small bubbles to the beverage which do not easily dissolve in water, resulting in a creamy frothy head, imparting sweetness, less acidic taste and a fuller, thicker mouth feeling beverages when compared to regular coffee brews.

In a final step, the cold-brew coffee extract may be filled and packaged according to methods known in the art, e.g. in cans (made of aluminum, steel or the like) or in bottles (made from glass, paper, retort pouch, or the like).

Figure 1:
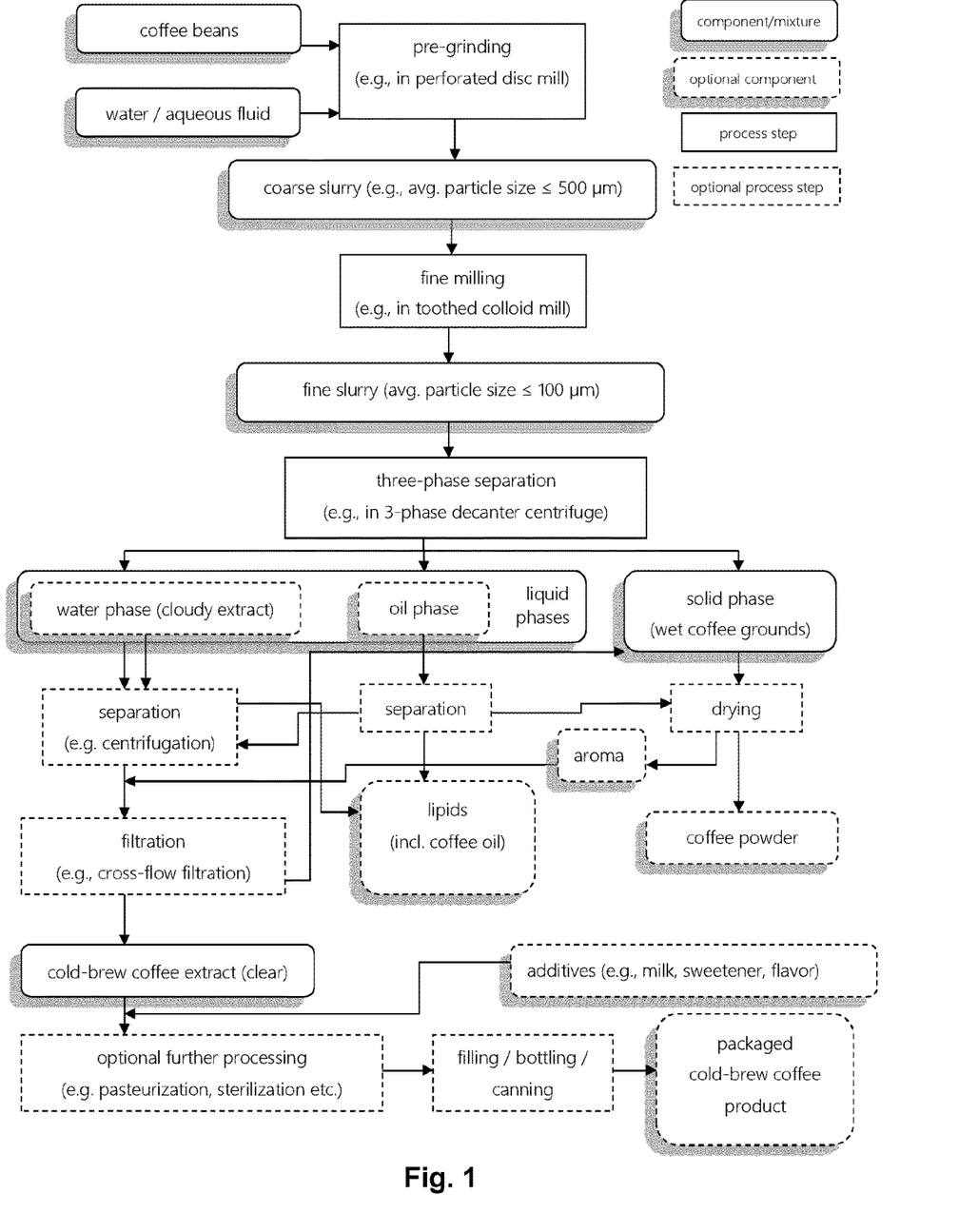
FIG. 1 schematically illustrates a method of processing coffee beans up to the preparation of cold-brew coffee extracts and products.

While not being limited thereto, an exemplary process of preparing a cold-brew coffee extract according to the above description is illustrated in the flowchart shown in FIG. 1.

It is noted that the method for producing a cold-brew coffee extract according to the present invention may be easily performed in a continuous manner. For example, the coffee beans may be continuously supplied to step (1) (by using conveyor belts or screw conveyors, for example), while the suspension during steps (1) to (4) may be transported by use of pump systems.

Where appropriate, buffer tanks may be interposed to adjust the extraction time and/or to ensure continuous product supply.

In general, it is preferred that steps (1) to (3) are performed within a time frame of less than 14 hours, preferably less than 10 hours, more preferably less than 6 hours, further preferably less than 3 hours, especially preferably less than 1 hour, in embodiments less than 45 minutes, less than 30 minutes or less than 20 minutes, such as from 15 seconds to 18 minutes or from 30 seconds to 1 minute.

It is further preferred that steps (1) to (4) are performed within a time frame of less than 18 hours, preferably less than 12 hours, more preferably less than 8 hours, further preferably less than 4 hours, especially preferably less than 2 hours, in embodiments less than 1 hour, less than 40 minutes, less than 25 minutes, such as from 30 seconds to 19 minutes or from 40 seconds to 2 minutes. Despite of such relatively short extraction durations, the method of the present invention provides extracts with higher flavor yield and richer taste when compared to conventional cold-brew techniques.

According to the present invention, it is ensured that the temperature of the suspension during steps (1) to (3) generally does not exceed 47° C. The lower limit of the suspension temperature is not particularly limited as long as the wet-grinding and phase separation steps are not impeded by freezing of the suspension, which may depend on the constituents of the aqueous solvent. Preferably, the temperature of the suspension during steps (1) to (3) ranges from 0° C. to 40° C., preferably from 2° C. to 35° C., and further preferably from 3° C. to 30° C., such as from 5° C. to 29° C. In addition, it may be preferred the temperature of the water phase during step (4) does not exceed 47° C. and preferably ranges from 0° C. to 40° C., more preferably from 2° C. to 35° C., further preferably from 3° C. to 30° C., and especially preferably from 5° C. to 29° C.

In the method of the present invention, the wet grinding step (2) to an average particle size of 100 μm or less typically has the strongest heating effect and may usually result in a temperature increase of around 5 to 15° C. Thus, in order to maintain the suspension or water phase temperatures at the above ranges, it is preferred that at the time of contacting the coffee beans, the water or water-containing liquid has a temperature of 40° C. or less, more preferably 30° C. or less, further preferably between 0 and 20° C., especially preferably between 2 and 15° C., such as from 4 to 12° C. Accordingly, the suspension temperature may be controlled in a convenient manner.

In an alternative embodiment not shown or indicated in FIG. 1, the method of the present invention may be adapted for the manufacture of an instant cold-brew coffee product. For this purpose, the cold-brew coffee extract may be subjected to a concentration step (by evaporation, preferably vacuum evaporation, or freeze concentration, for example), followed by spray-drying or freeze-drying of the concentrated extract into powder form. Herein, the concentration step may involve an evaporation of flavor compounds and polyphenols together with the water. In this case, it is preferable to collect these fractions and to reintroduce the same prior to spray-drying or freeze-drying or prior to packaging of the instant powder. It is also possible to incorporate further edible components (such as coffee cherry pulp, for example) into the extract to increase the solid content and hence facilitate drying.

In addition, the cold-brew coffee extract may be subjected to the concentration step only (i.e. without a step of spray-drying or freeze-drying) and packaged for delivery to the customer as a liquid concentrate.

Liquid Cold-Brew Coffee Extracts and Instant Cold-Brew Coffee Powders

In a second embodiment, the present invention relates to cold-brew coffee extracts obtained by the method according to the first embodiment outlined above. In a preferred embodiment, the cold-brew coffee extract is coffee aroma obtained by the method according to the first embodiment, which may preferably include a combination of the coffee aroma obtained by processing the liquid phase(s) and coffee aroma fractions recovered from the processing of the solid phase (see FIG. 1, for example).

In a third embodiment, the present invention relates to instant cold-brew coffee powder obtained by subjecting the cold-brew coffee extract according to the second embodiment to a concentration step, followed by spray-drying or freeze drying of the concentrated extract to obtain the instant cold-brew coffee powder.

In comparison to known cold-brew products, the extracts and instant products of the present invention are distinctly characterized in that they exhibit a rich taste, high flavor complexity, and a high content of flavors perceived as pleasant (e.g. caramel-like, malty, nutty and spicy flavors). Simultaneously, off-flavors often perceived in conventional products, presumably due to prolonged cold extraction, are remarkably reduced or entirely eliminated.

EXAMPLES

Example 1

A liquid cold-brew coffee extract has been prepared according to the method of the present invention, by mixing roasted coffee beans (origin: Sidamo) with demineralized and sterile filtrated water, coarse-grinding the aqueous suspension in a perforated disc mill (FrymaKoruma ML 150) and fine-grinding the coarse slurry with a toothed colloid mill (FrymaKoruma MZ 130) to an average particle size of 100 μm or less. Thereafter, the finely ground suspension was subjected to a three-phase separation with a three-phase decanter centrifuge (Tricanter® manufactured by Flottweg SE). The thus obtained water phase was clarified by removing fat and colloidal solids by using a separator centrifuge (GEA Westfalia). Finally, the clarified extract was filtrated by cross-flow filtration using a commercially available Koch Supercor PVDF membrane (12 mm diameter, 35 m2 area, and 0.2 μm pore size). During the process, the suspension/water phase temperature did not exceed room temperature. The total extraction time was approximately 10 minutes.

Comparative Example 1

In Comparative Example 1, the same coffee beans as in Example 1 were finely ground and subsequently subjected to conventional cold-brewing with demineralized and sterile filtrated water at 20° C. for a period of 8 hours and subsequent filtration, using the same weight ratio of coffee beans to water as Example 1.

Comparative Example 2

Comparative Example 2 has been prepared in analogy with Comparative Example 1, with the exception that the extraction has been performed with hot water (95° C.) for a period of 4 minutes, using the same weight ratio of coffee beans to water as Example 1.

Evaluation

Immediately after preparation of the extracts, samples of Example 1 and Comparative Examples 1 and 2 were independently diluted (50 g/L) and quantitatively analyzed via GC-MS for their content of twenty selected key coffee aromas. The measurement results are shown in Table 1 below, together with the odor threshold values.

The quantitative analysis shows that the method of the present invention provides extracts with substantially improved total yield of pleasant aromas when compared to conventional cold-brew methods despite of radically reduced extraction durations. In addition, Table 1 shows that the total aroma yield even surpasses that of hot water infusion methods as exemplified by Comparative Example 2.

samples and their definitions were developed and included flowery, fruity, caramel-like, malty, nutty, spicy, roasty, and grassy notes, as well as off-flavors, complexity and total intensity. The judges then evaluated these sensory attributes for each of the samples, using a nine-point rating system (0 to 8), wherein low values indicate weak perception, high values indicate a strong intensity and 0 indicates the absence of the respective note. The samples were each tested for pro-nasal and retro-nasal perception (i.e. on the palate).

Figure 2:
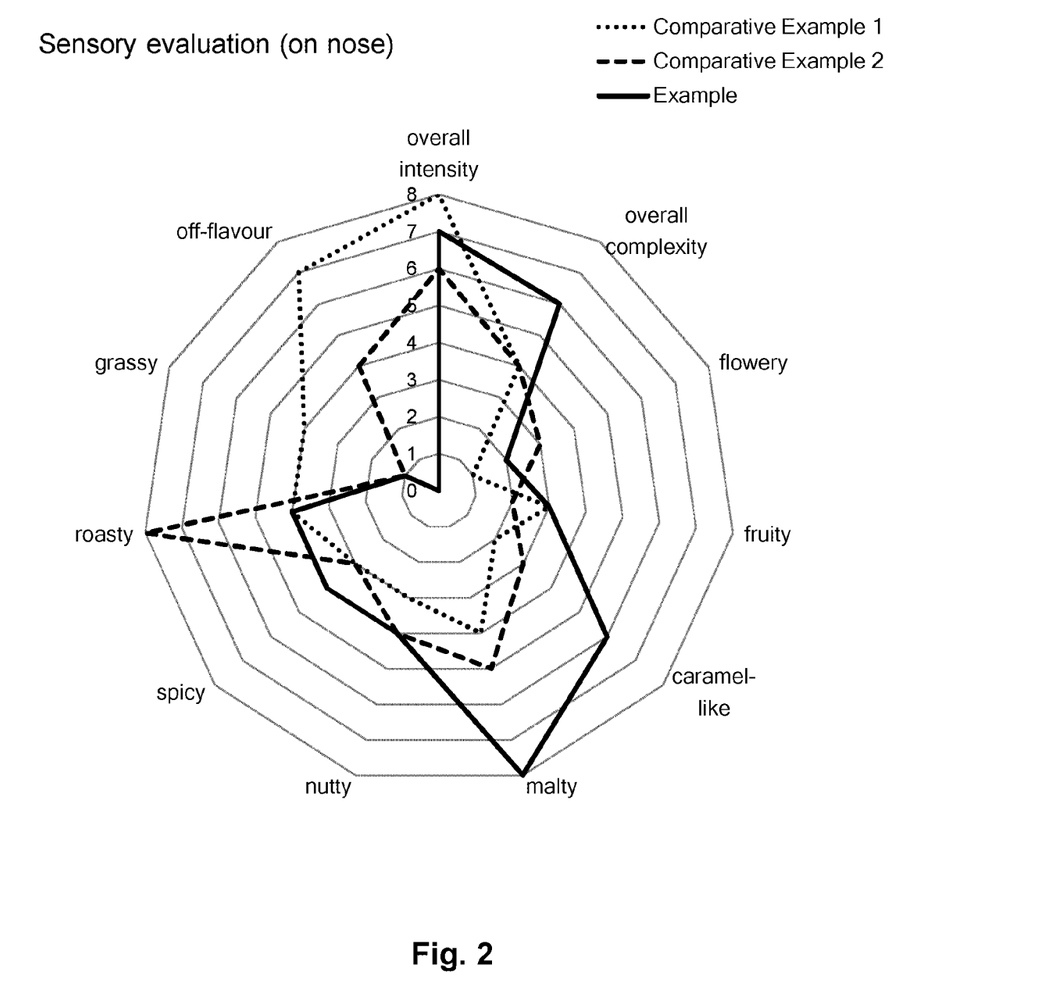
FIG. 2 shows the results of a sensory evaluation (on nose) of comparative examples and an exemplary cold-brew product according to the present invention.
Figure 3:
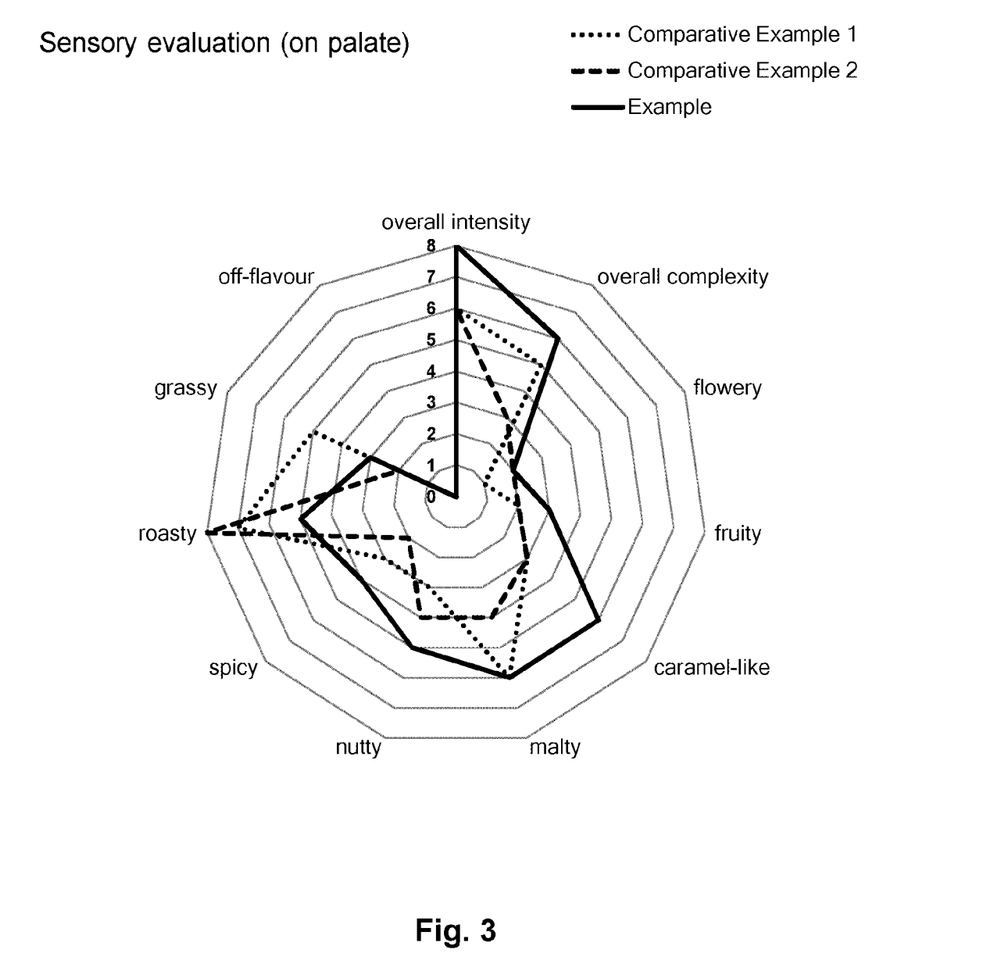
FIG. 3 shows the results of a sensory evaluation (on palate) of comparative examples and an exemplary cold-brew product according to the present invention.

The results of the sensory profiles as perceived on the nose and on the palate are shown in FIG. 2 and FIG. 3, respectively, wherein the intensity values indicate the mean values assigned by the expert panel.

As is shown in FIG. 2, no off-flavors were perceived in samples of Example 1, in contrast to the pro-nasal evaluation of the samples of Comparative Examples 1 and 2. Simultaneously, samples of Example 1 showed higher scores in complexity and in notes perceived as pleasant, with particular emphasis on caramel-like, malty and spicy notes.

FIG. 3 demonstrates that the samples of the present invention also exhibit a superior overall intensity and complexity on the palate and—with exception of the roast flavors—further show higher scores in all note categories when compared to the hot-brewed samples of Comparative Example 2.

TABLE 1

| Compound | Odour Threshold Value [µg/l] | Example 1 [µg/l] | Comparative Example 1 [µg/l] | Comparative Example 2 [µg/l] |
| --- | --- | --- | --- | --- |
| 2-Isobutyl-3-methoxypyrazine (green) | 0.005 | 18 | 32 | 24 |
| Dimethyl trisulfide (roasty) | 0.01 | 35 | 72 | 31 |
| B-Damascenone (baked apple) | 0.00075 | 3693 | 1267 | 1453 |
| 2-Acetyl-1-pyrroline (Popcorn) | 0.007 | 154 | 287 | 291 |
| 4-Cresol (horse stable) | 55 | 1 | 1 | 1 |
| 2,3-Diethyl-5-methylpyrazine (earthy, roasty) | 0.09 | 37 | 27 | 20 |
| 2-Ethyl-3,5-dimethylpyrazine (earthy) | 0.16 | 30 | 39 | 35 |
| 3-Methylsulfanylpropanal (potato) | 0.2 | 34 | 41 | 49 |
| (Furan-2-yl)methanethiol (coffee) | 0.01 | 2620 | 3190 | 2790 |
| 3-Hydroxy-4,5-dimethylfuran-2(5H)-one (tasty, hot) | 20 | 3 | 2 | 3 |
| Phenylacetaldehyde (flowery) | 4 | 16 | 13 | 15 |
| Vanilline (sweet) | 20 | 2 | 3 | 3 |
| 2-Ethyl-3,6-dimethylpyrazine (earthy) | 0.4 | 168 | 177 | 119 |
| 2-Methylbutanoic acid (sweaty, sweet) | 540 | 1 | 1 | 1 |
| Guaiacol (smoky) | 3 | 45 | 41 | 39 |
| 3-Methylbutyraldehyde (malty, chocolate) | 0.4 | 823 | 648 | 458 |
| 4-Vinylguaiacol (tasty, hot) | 20 | 18 | 17 | 17 |
| 3-Methylbutanoic acid (sweaty) | 700 | 1 | 1 | 1 |
| Butane-2,3-dione (buttery) | 15 | 36 | 15 | 53 |
| Pentane-2,3-dione (buttery) | 30 | 9 | 34 | 46 |
| 2-Methylbutyraldehyde (malty, chocolate) | 1.9 | 385 | 611 | 266 |
| 4-Hydroxy-2,5-dimethyl-3-furanone (caramel) | 31 | 116 | 106 | 117 |
| Total | | 8236 | 6661 | 5812 |

In addition to quantitative analysis, a sensory analysis of diluted samples (50 g/L) of each extract of Example 1 and Comparative Examples 1 was performed by a panel of five experts experienced in sensory evaluation of coffee (consensus profile). Initially, the sensory attributes of the coffee Overall, the results indicate that, despite of a short extraction period at low temperatures, the cold-brew coffee extracts of the present invention exhibit a richer taste, higher flavor complexity, and a higher total content of flavors perceived as pleasant, while entirely eliminating off-flavors.

Once given the above disclosure, many other features, modifications, and improvements will become apparent to the skilled artisan.

The invention claimed is:

1. A method for producing a cold-brew coffee extract, the method comprising the steps of:
   (1) adding water to coffee beans to form a suspension;
   (2) wet grinding the suspension in multiple steps to provide a suspension having an average particle size less than or equal to 100 µm;
   (3) subjecting the suspension of step (2) to one or more separation steps, wherein the suspension of step (2) is separated into at least one liquid phase and a solid phase, the at least one liquid phase comprising coffee aroma, and the solid phase comprising wet coffee grounds; and
   (4) further processing at least one liquid phase to provide the cold-brew coffee extract, wherein the temperature of the suspension during steps (1) to (3) does not exceed 47° C.; and wherein the cold-brew coffee extract obtained in step (4) exhibits a residual fat content of 1 wt % to 10 wt % and a dry matter content of 2 wt % to 12 wt %.

2. The method of claim 1, wherein the suspension of each of steps (1) to (3) independently have a temperature which ranges from 0° C. to 40°° C.

3. The method of claim 1, wherein the liquid phase of step (4) has a temperature which does not exceed 47° C.

4. The method of claim 1, wherein step (2) comprises:
   (a) coarse grinding the suspension one or more times to provide a suspension having an average particle size less than or equal to 500 µm; and
   (b) subsequently fine grinding the suspension having an average particle size less than or equal to 500 µm to provide a suspension having an average particle size of less than or equal to 100 µm.

5. The method of claim 1, wherein step (3) comprises a step of separating the suspension into a liquid phase comprising coffee aroma, an oil phase comprising coffee oil, and a solid phase comprising wet coffee grounds, by the use of a decanter, wherein the separating is optionally performed in a single separation stage.

6. The method of claim 5, wherein step (3) further comprises a step of separating water from the solid phase to provide separated water and, an adding the separated water to the liquid phase before step (4).

7. The method of claim 1, wherein steps (1) to (4) are performed in a continuous manner.

8. The method of claim 1, wherein steps (1) to (3) are performed within a time frame of less than 10 hours.

9. The method of claim 1, wherein steps (1) to (4) are performed within a time frame of less than 12 hours.

10. The method of claim 5, wherein step (4) does not comprise a filtration or clarification step comprises subjecting the liquid phase obtained in step (3) to one of more separation steps.

11. The method of claim 1, wherein the method does not comprise a filtration or clarification step.

12. A cold-brew coffee extract prepared by the method of claim 1.

13. An instant cold-brew coffee powder prepared by subjecting the cold-brew coffee extract of claim 12 to a concentration step to provide a concentrated extract, and spray-drying or freeze drying the concentrated extract.

14. The method of claim 2, wherein the suspension of each of steps (1) to (3) independently have a temperature which ranges from 3° C. to 30° C.

15. The method of claim 3, wherein the liquid phase of step (4) has a temperature which ranges from 3°° C. to 30° C.

16. The method of claim 4, wherein the fine grinding provides a suspension having an average particle size less than or equal to 80 µm.

17. The method of claim 8, wherein steps (1) to (3) are performed within a time frame of less than 30 minutes.

18. The method of claim 9, wherein steps (1) to (4) are performed within a time frame of less than 40 minutes.

19. The cold-brew coffee extract of claim 12, wherein the cold-brew coffee extract exhibits a residual fat content of 1.5 wt % to 5 wt % and a dry matter content of 2.5 wt % to 10 wt %.

* * * * *